(12) United States Patent
Green et al.

(10) Patent No.: US 6,405,232 B1
(45) Date of Patent: Jun. 11, 2002

(54) LEADING BIT PREDICTION WITH IN-PARALLEL CORRECTION

(75) Inventors: Daniel W. Green, McKinney, TX (US); Atul Dhablania, San Jose, CA (US); Jeffrey A. Lohman, Plano; Bang Nguyen, Dallas, both of TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/377,139

(22) Filed: Aug. 19, 1999

(51) Int. Cl.[7] .......................... G06F 9/302; G06F 9/315
(52) U.S. Cl. ....................... 708/505; 712/222
(58) Field of Search ............................ 708/505; 712/222

(56) References Cited

U.S. PATENT DOCUMENTS

| | | | |
|---|---|---|---|
| 4,949,291 A | 8/1990 | Saini | |
| 5,040,138 A | 8/1991 | Maher, III | 364/748 |
| 5,144,570 A | 9/1992 | Maher, III | 364/715 |
| 5,161,117 A | 11/1992 | Waggener, Jr. | 364/715 |
| 5,247,471 A * | 9/1993 | Hilker et al. | 708/505 |
| 5,257,215 A | 10/1993 | Poon | 364/745 |
| 5,272,654 A | 12/1993 | Nix | 364/715 |
| 5,561,615 A | 10/1996 | Kuo et al. | 364/715 |
| 5,584,009 A | 12/1996 | Garibay, Jr. et al. | 395/444 |
| 5,619,198 A | 4/1997 | Blackham et al. | 341/50 |
| 5,633,819 A | 5/1997 | Brashears et al. | 364/748 |
| 5,644,741 A | 7/1997 | Bluhm et al. | |
| 5,652,584 A | 7/1997 | Yoon | |
| 5,684,729 A * | 11/1997 | Yamada et al. | 708/505 |
| 5,835,967 A | 11/1998 | McMahan | |
| 6,085,211 A * | 7/2000 | Yoshioka | 708/505 |

OTHER PUBLICATIONS

*Leading–Zero Anticipatory Logic for High–Speed Floating Point Addition*, by Hiroaki Suzuki, Hiroyuki Morinaka, Hiroshi Makino, Yashunobu Nakase, Koichiro Mashiko, Member IEEE, and Tadashi Sumi, IEEE Journal of Solid–State Circuits, vol. 31, No. 8, Aug. 1996.

* cited by examiner

*Primary Examiner*—William M. Treat
(74) *Attorney, Agent, or Firm*—John L. Maxin (57) ABSTRACT

For use in a processor having a floating point unit (FPU) capable of managing denormalized numbers in floating point notation, logic circuitry for, and a method of adding or subtracting two floating point numbers. In one embodiment, the logic circuitry includes: (1) an adder that receives the two floating point numbers and, based on a received instruction, adds or subtracts the two floating point numbers to yield a denormal sum or difference thereof, (2) a leading bit predictor that receives the two floating point numbers and performs logic operations thereon to yield predictive shift data denoting an extent to which the denormal sum or difference is required to be shifted to normalize the denormal sum or difference, the predictive shift data subject to being erroneous and (3) predictor corrector logic that receives the two floating point numbers and performs logic operations thereon to yield shift compensation data denoting an extent to which the predictive shift is erroneous. The denormal sum or difference, predictive shift data and shift compensation data are providable to a shifter to allow the denormal sum or difference to be normalized.

20 Claims, 7 Drawing Sheets

LEADING BIT PREDICTION WITH IN-PARALLEL CORRECTION

CROSS-REFERENCES TO RELATED APPLICATIONS

This patent application is related to commonly assigned and contemporaneously filed U.S. Patent applications 09/377,683 entitled "ROUNDING DENORMALIZED NUMBERS IN A PIPELINED FLOATING POINT UNIT WITHOUT PIPELINE STALLS"; Ser. No. 09/377,683 entitled "FORMATTING DENORMAL NUMBERS FOR PROCESSING IN A PIPELINED FLOATING POINT UNIT"; Ser. No. 09/377,140 entitled "CONVERTING NEGATIVE FLOATING POINT NUMBERS TO INTEGER NOTATION WITHOUT TWO'S COMPLEMENT HARDWARE"; and Ser. No. 09/377,136 entitled "INTEGER TO FLOATING POINT CONVERSION USING ONE'S COMPLEMENT WITH SUBSEQUENT CORRECTION TO ELIMINATE TWO'S COMPLEMENT IN CRITICAL PATH", all of which are herein incorporated by reference.

TECHNICAL FIELD OF THE INVENTION

The present invention is directed, in general, to microprocessors and, more particularly, to a processor architecture employing an improved floating point unit (FPU).

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The T/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, the processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The speed at which a processor can perform a desired task is also a function of the number of instructions required to code the task. A processor may require one or many clock cycles to execute a particular instruction. Thus, in order to enhance the speed at which a processor can perform a desired task, both the number of instructions used to code the task as well as the number of clock cycles required to execute each instruction should be minimized.

Statistically, certain instructions are executed more frequently than others. If the design of a processor is optimized to rapidly process the instructions that occur most frequently, then the overall throughput of the processor can be increased. Unfortunately, the optimization of a processor for certain frequent instructions is usually obtained only at the expense of other less frequent instructions, or requires additional circuitry, which increases the size of the processor.

As computer programs have become increasingly more graphic-oriented, processors have had to deal more and more with operations on numbers in floating point notation, one aspect of which involves "normalization". Performing a floating point mathematical operation and normalizing the result can be a relatively slow and tedious process; after computational circuitry performs a floating point operation on two operands, the result must be normalized so as to contain a "one" in the most significant bit ("MSB") of the mantissa. A leading zero counter ("LZC"), or leading one detector, is often used to count the number of leading zeros, or detect the bit position of the first one, in the mantissa and the floating point result is then normalized by shifting the mantissa the number of bits indicated by the LZC. The result must also be converted to a signed magnitude form and rounded to ensure sufficient accuracy and precision; typically, the steps of converting and rounding require two separate passes through an adder circuit.

Both computation and normalization steps can be time consuming; for example, the computation step is delayed due to the carry propagation of data during the floating point operation. In conventional systems, the normalization process does not begin until after the floating point operation is complete; for example, see U.S. Pat. No. 5,633,819 to Brashears, et. al. issued May 27, 1997. Thus, conventional FPUs are inherently slow since the computation and normalization steps must be performed sequentially.

Several approaches have been developed to decrease the time required for the computation and normalization of numbers associated with floating point mathematical operations. One such approach employs leading-zero anticipatory logic, such as that disclosed by Suzuki, et al., in "Leading-Zero Anticipatory Logic for High-Speed Floating Point Addition", IEEE Journal of Solid-State Circuits, Vol. 31, No. 8, August 1996, or Hokenek and Montoye in "Leading-zero Anticipator (LZA) in the IBM RISC System/6000 Floating-point Execution Unit", IBM J. Res. Develop., Vol. 34, No. 1, January 1990, or as described in U.S. Pat. Nos. 5,144,570 and 5,040,138, all of which are incorporated herein by reference. Although the LZA approach can be used to minimize the time required for computation and normalization, the LZA approach has the possibility of anticipating wrongly, requiring a correction step. Circuits and methods have been proposed for correcting a wrongly anticipated leading bit; such approaches, however, have heretofore increased the time required for the normalization of numbers associated with floating point mathematical operations.

Therefore, what is needed in the art is a system and method for correcting a leading bit predictor, and a processor employing the same, that minimizes the time required for the normalization of numbers associated with floating point mathematical operations.

SUMMARY OF THE INVENTION

To address the above-discussed deficiencies of the prior art, it is a primary object of the present invention to provide a way of analyzing error in a leading bit prediction without requiring the leading bit prediction to be performed beforehand.

In the attainment of the above primary object, the present invention provides, for use in a processor having an FPU capable of managing denormalized numbers in floating point notation, logic circuitry for, and a method of adding or subtracting two floating point numbers. In one embodiment, the logic circuitry includes: (1) an adder that receives the two floating point numbers and, based on a received instruction, adds or subtracts the two floating point numbers to yield a denormal sum or difference thereof, (2) a leading bit predictor that receives the two floating point numbers and performs logic operations thereon to yield predictive shift data denoting an extent to which the denormal sum or difference is required to be shifted to normalize the denormal sum or difference (usually expressed in terms of numbers of bits), the predictive shift data subject to being erroneous (usually by one bit) and (3) predictor corrector logic that receives the two floating point numbers and performs logic operations thereon to yield shift compensation data denoting an extent (usually zero bits or one bit) to which the predictive shift is erroneous. The denormal sum or difference, predictive shift data and shift compensation data are providable to a shifter to allow the denormal sum or difference to be normalized (preferably in one shift operation).

The present invention therefore introduces the broad concept of analyzing the two floating point numbers themselves to determine whether the predictive shift data that the leading bit predictor has already generated, or is concurrently generating, is erroneous. This is in stark contrast to the prior art, which required that the sum or difference and the predictive shift data itself be analyzed to make such determination, constraining the predictor corrector to act only after the adder and leading bit counter completed operation.

In one embodiment of the present invention, the adder, the leading bit predictor and the predictor corrector receive the two floating point numbers concurrently, or preferably simultaneously. The present invention therefore finds particular utility in an adder architecture in which the adder, the leading bit predictor and the predictor corrector operate at the same time, such that while the adder calculates the sum or difference, both the predictive shift data and the shift compensation data are being developed.

In one embodiment of the present invention, the predictor corrector detects a second occurrence of an 0P or 0M sequence (these and all other possible sequences will be defined explicitly in the Detailed Description to follow) in a bitwise combination of fraction portions of the two floating point numbers. When the first of the two floating point numbers is larger than the second, the result of an addition or subtraction is necessarily positive. In such cases, if the leading bit indicator detects a PP sequence, the predictive shift data are accurate; no compensation is required. If the leading bit predictor detects a P0 sequence (also to be defined in the Detailed Description), the predictive shift data may be erroneous (off by one). If an 0P sequence follows the P0 sequence, the predictive shift data are accurate because it is equivalent to a PP sequence. If, instead, an 0M sequence follows, the predictive shift data are erroneous and the shift compensation data must compensate for the error.

In one embodiment of the present invention, the predictor corrector contains plural ranks of pattern analysis logic blocks, each of the pattern analysis logic blocks capable of generating signals indicating a quantity and location of 0P or 0M sequences in a combination of fraction portions of the two floating point numbers. The specific manner in which one embodiment of the pattern analysis logic blocks operates will be set forth in detail in an embodiment to be illustrated and described. Those skilled in the art will realize, however, that other circuitry can be employed to perform such analysis without departing from the spirit and scope of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
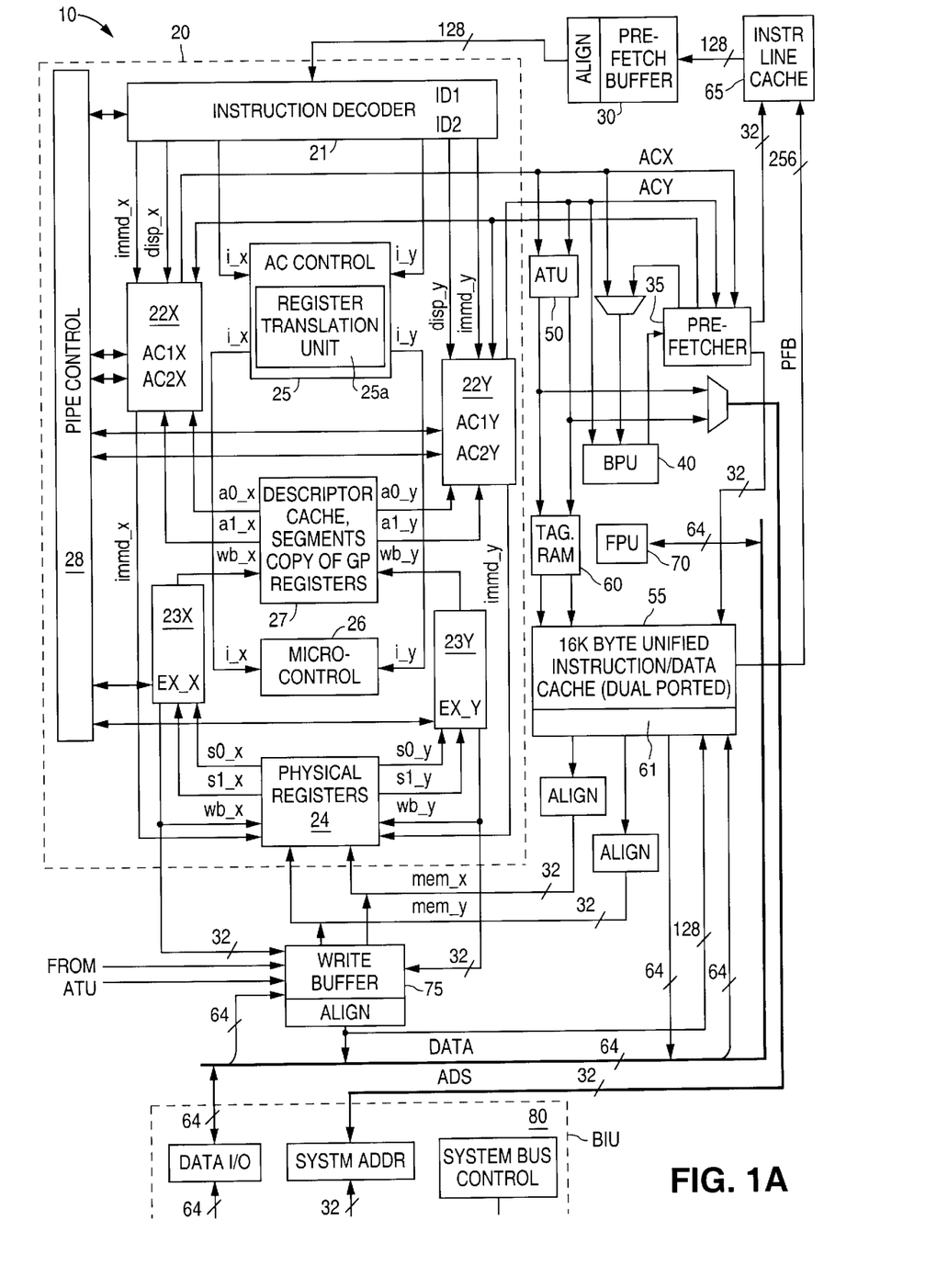
FIG. 1a illustrates a block diagram of an exemplary superscalar and superpipelined processor in accordance with the principles of the present invention.

Referring initially to FIG. 1a, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75 (one shown), and a bus interface unit ("BIU") 80. Each of the above-identified components is conventional, i.e., their functionality is known. The functionality associated with the interrelationship of various ones of the components is also known. Exemplary processors implementing the foregoing are the 6x86 and MII processors available from Cyrix Corporation of Richardson, Tex.

In an exemplary embodiment, instruction line cache 65 and unified cache 55 operate as primary and secondary instruction caches, respectively, each having a 32 byte line size. This implementation reduces instruction fetches to unified cache 55. In a preferred embodiment, instruction line cache 65 may be a 256 byte cache, while unified cache 55 maybe a 16 kilobyte ("Kbyte") code/data cache. Unified cache 55 may also be associated with TAG RAM 60. In another exemplary embodiment, processor 10 may use a 32-bit address bus ("ADS"), a 64-bit data bus ("DATA") and a 256 bit ore-fetch bus ("PFB"). The PFB corresponds to the 32 byte line sizes of unified cache 55 and instruction line cache 65, and enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") stage 21, two address calculation/operand access ("AC") stages, 22X and 22Y, two execution ("EX") stages, 23X and 23Y, and a register file 24 having 31 32-bit registers. Core 20 further includes an AC control stage 25, a microcontrol unit 26, a pipe control unit 28, and a second register file 27 containing a descriptor cache, segment registers and a copy of the logical general purpose registers.

Exemplary ID stage 21 is operative to decode a variable length x86-based instruction set, and may retrieve 16 bytes of instruction data from pre-fetch buffer 30 each clock cycle. Exemplary AC stages 22X and 22Y are each operative to perform address calculations for their respective execution pipelines. Exemplary EX stages 23X and 23Y are each operative to execute instructions within their respective execution pipelines. Exemplary register file 24 includes 31 physical registers. Exemplary AC control stage 25, which includes a register translation unit 25a, and may further include appropriately arranged register renaming hardware (not shown), is operative to control address calculations. Exemplary microcontrol unit 26, which may include a micro-sequencer (not shown) and a micro-ROM (not shown), provides execution control. Again, exemplary second register file 27 may include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may use the excess mapping capacity by allowing register translation unit 25a to map to a physical register other than those located in register file 24. In the illustrated embodiment, the physical register may be located in second register file 27, which is under control of AC control unit 25. In an alternate exemplary embodiment, pipe control unit 28 is further operative to remove bubbles from the instruction stream, i.e., "flushing" the execution pipelines behind branches that are mis-predicted and handling the execution of exception-causing instructions.

More particularly, BPU 40 monitors speculative execution associated with branches or floating point instructions (i.e., execution of instructions speculatively issued after branches that may be mis-predicted or floating point Instructions issued to FPU 70 that may fault after execution of speculatively-issued instructions). In the event that a branch is mis-predicted (a condition not known until the instruction reaches one of the execution or write-back stages for the branch) or a floating point instruction faults, the execution pipeline is repaired to the point of the mis-predicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., programmer-visible registers, the instruction pointer and the condition code register) that may be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may be queued into write buffer 7D. Write buffer 75 provides an interface for writes to unified cache 55, while non-cacheable writes proceed directly from write buffer 75 to an external memory (shown and described in conjunction with FIG. 2). Write buffer logic may support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffer 75 (i.e., write buffer 75 is preferably allocated for each floating point store operation).

Figure 1B:
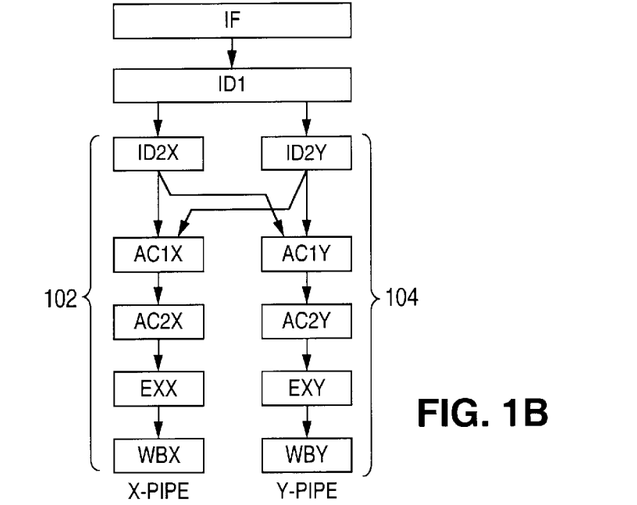
FIG. 1b illustrates a block diagram of seven exemplary pipelined stages of the processor of FIG. 1a, including X and Y execution pipelines.

Turning to FIG. 1b, illustrated is a block diagram of seven exemplary pipelined stages of processor 10 of FIG. 1a, including X and Y execution pipelines. As before, each of the X and Y execution pipelines includes IF, ID1, ID2, AC1, AC2, EX and WB stages. Exemplary IF stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode stages ID1 and ID2 decode a variable length x86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 which subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is determined during the ID stages, causing the instruction to be issued into that pipeline. In an exemplary embodiment, circuitry is provided for pipeline switching which enables instructions to be switched from ID2X to AC1Y and from ID2Y to AC1X, as certain instructions (e.g., change of flow, floating point, exclusive or other like instructions) may only be issued in one of the two pipelines.

"Exclusive instructions" as the phrase is used herein, include any instructions that may fault within the EX pipeline stage, as well as certain instruction types, such as protected mode segment loads, string, spec-al register access (control, debug, test, etc.), Multiply/Divide, Input/Output, PUSHA/POPA (PUSH all/POP all), task switch and the like. Exclusive instructions may use the resources of both execution pipelines; exclusive instructions are preferably issued alone from the ID stage.

Exemplary address calculation stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, programmer-visible logical registers in accordance with x86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC stage preferably includes eight logical, or architectural, registers, representing the x86-based register set. In a preferred embodiment, the logical register corresponding to the stockpointer ("ESP") contains the actual stackpointer (instead of simply a copy thereof) when control of the stackpointer is allocated to AC1. If an instruction requires one or more address calculations, AC1 is operative to wait until the required data of the logical registers are valid before accessing those registers. During AC2, operands are obtained by accessing register file 24 and unified cache 55 with the physical address. The physical address therefore is preferably either the linear address or, if address translation is enabled, a translated address generated by ATU 50.

Exemplary ATU 50 is operative to generate translated addresses, preferably using a translation lookaside buffer ("TLB") or the like, from the linear address using information from page tables in memory and local workspace control registers. Unified cache 55 is virtually indexed and physically tagged to permit, when address translation is enabled, set selection with the un-translated address (available at the end of AC1) and, for each set, tag comparison with the translated address from ATU 50 (available early in AC2). In the illustrated embodiment, segmentation or address translation violation checks are performed in AC2.

Instructions within a given Instruction code stream are preferably kept in order until it is determined that out-of-order execution of the same will not cause an exception. This determination may be made during or before AC2, although floating point and certain exclusive instructions may cause exceptions during execution. Instructions are passed from AC2 to EX (floating point instructions are passed to FPU 70). Instructions spend a variable number of clock cycles in EX as many of the same may execute out of order. Integer instructions may cause exceptions in EX and are therefore designated as exclusive and issued alone into both execution pipelines, thereby ensuring that exceptions are handled in order.

Exemplary execution stages EX X and EX Y perform the operations defined by a given instruction using one or more adders, multiplexers, shifters, or other functional units. The EX X execution stage may also include multiplication and division hardware.

Exemplary write back stage ("WB") updates register file 24, condition codes, as well as other parts of an associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in U.S. Pat. No. 5,584,009 entitled "System And Method Of Retiring Store Data From A Write Buffer"; U.S. Pat. No. 5,835,967 entitled "Adjusting Prefetch Size Based On Source Of Prefetch Address"; and U.S. Pat. No. 5,644,741 entitled "Processor With Single Clock Decode Architecture Employing Single MicroROM", all of which are commonly assigned to the Assignee of the present invention and are herein incorporated by reference.

Figure 2:
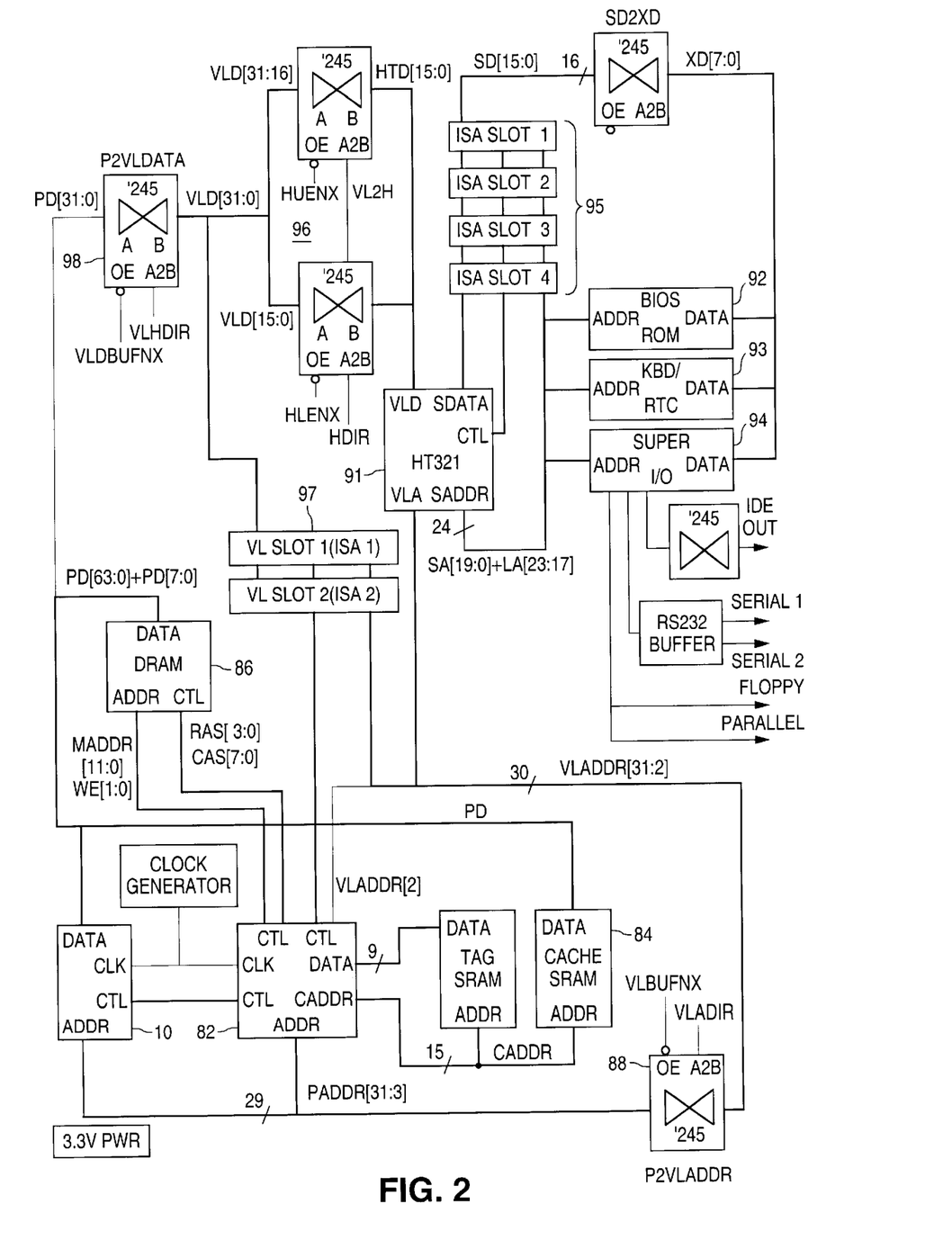
FIG. 2 illustrates a block diagram of an exemplary processor system incorporating the processor of FIGS. 1a and 1b.

Turning to FIG. 2, illustrated is an exemplary processor system design, in the form of a motherboard, that advantageously employs exemplary processor 10 of FIGS 1a and 1b in cooperation with a single chip memory/bus controller 82. Controller 82 provides an interface between processor 10 and an external memory subsystem controlling data movement over the 64-bit processor data bus. The external memory subsystem includes level two cache 84 and main memory 86. In accordance with the illustrated embodiment, the data path may be external to controller 82 thereby reducing its pin count and cost.

Controller 82 preferably interfaces with ADS, the 32-bit address bus, directly and includes a one bit wide data port (not shown) for reading and writing registers within controller 82. A bidirectional isolation buffer 88 is preferably provided as an address Interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may interface to a basic input/output system; ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97 and, through a bidirectional isolation buffer 98, to the low double word of PD.

Figure 3:
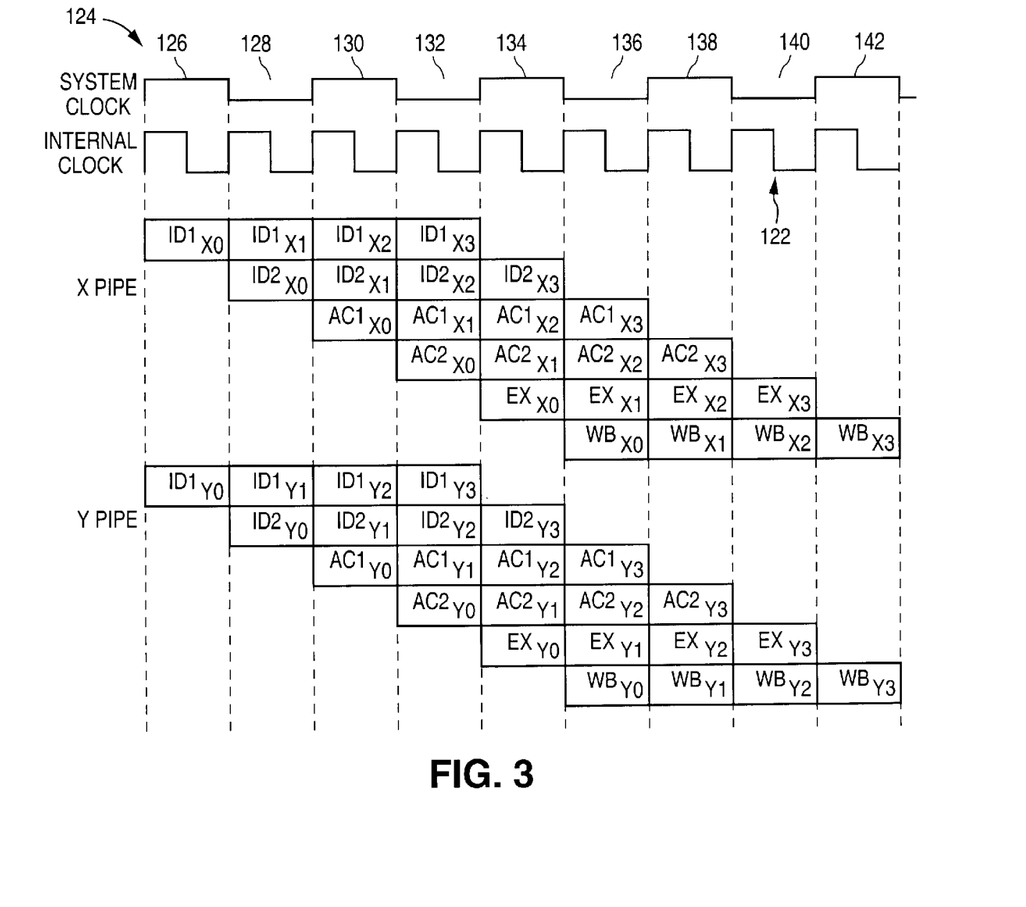
FIG. 3 illustrates an exemplary timing diagram demonstrating the flow of instructions through a pipeline in accordance with the exemplary processor of FIGS. 1a through 2.

Turning to FIG. 3, illustrated is an exemplary timing diagram demonstrating the flow of instructions through a pipeline of processor 10 of FIGS. 1a and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 stage operates respectively on instructions X0 and Y0. During internal clock cycle 128, instructions X0 and Y0 are in the ID2 stage (X0 being in ID2X and Y0 being in ID2Y) and instructions X1 and Y1 are in the ID1 stage. During internal clock cycle 130, instructions X2 and Y2 are in the ID1 stage, instructions X1 and Y1 are in the ID2 stage (X1 being in ID2X and Y1 being in ID2Y) and instructions X0 and Y0 are in the AC1 stage (X0 being in AC1X and Y0 being in AC1Y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more stages may require additional clock cycles for completion, thereby changing instruction flow through the other pipeline stages. Further, instruction flow through one pipeline may depend upon the flow of other instructions in the same or the other pipeline.

Figure 4:
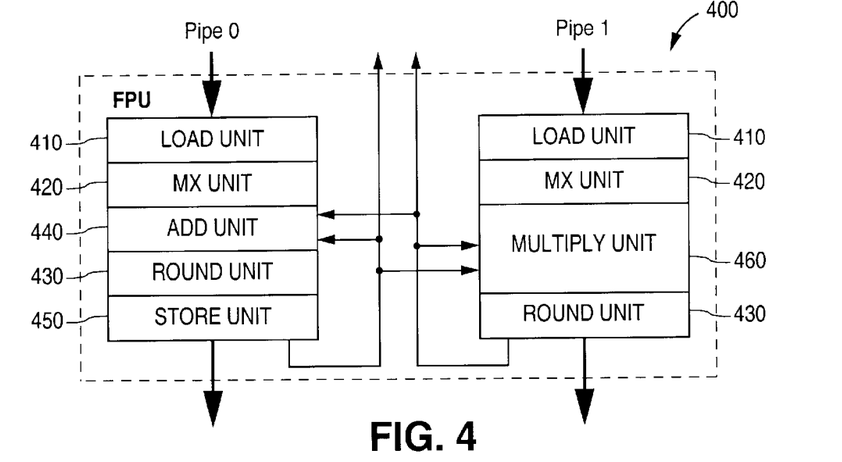
FIG. 4 Illustrates an exemplary pipelined floating point unit ("FPU") adaptable to employ the principles of the present invention.

The focus of the present invention is directed to optimizing the operation or FPU 70 in FIG. 1. FIG. 4 illustrates an exemplary pipelined FPU 400 adaptable to employ the principles of the present invention. In the embodiment illustrated, the FPU 400 is designed to be non-symmetric superscalar, which allows for maximum throughput without excessive duplication of execution resources. The exemplary FPU 400 has two pipes, Pipe0 and Pipe1, each having a load unit 410, a multi-media extensions ("MX") unit 420, and a round unit 430. Pipe0 further includes an add unit 440 and a store unit 450, and Pipe1 further includes a multiply unit 460. Although the exemplary architecture of FPU 400 may be adapted to employ the principles of the present invention, the present invention is not limited to a specific FPU architecture. From the description hereinafter, those skilled in the art will readily conceive of the means and advantages of employing the system and method disclosed herein to provide a way of analyzing error in a leading bit prediction without requiring the leading bit prediction to be performed beforehand, thereby improving the performance of an FPU employing the system or the method.

In one embodiment, the load unit 410 is operative to read operands from memory and convert them from a memory format to a format suitable for use within the FPU 400; for example, the load conversion may consist of converting an operand from a memory format to an internal floating-point format.

Figure 5:
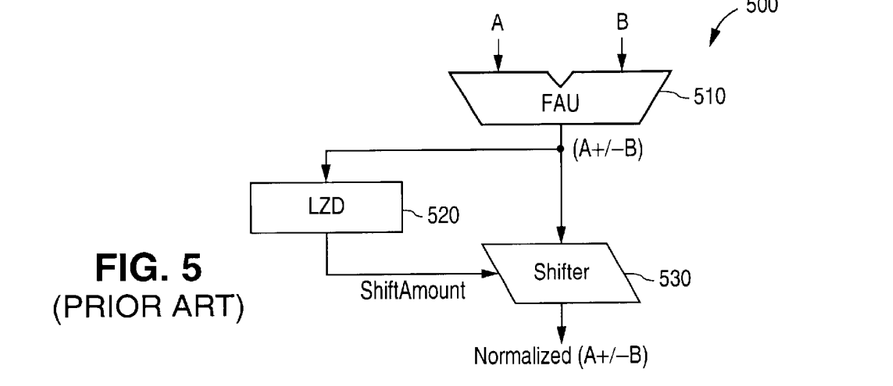
FIG. 5 illustrates a conventional technique for adding two operands and normalizing the result.

In a floating point addition algorithm optimized for pipelined operation, which may be performed by add unit 440, there exists a need to do a leading zero count for the number before normalization. In the past, the leading zero count process had to wait until the actual addition/subtraction for the numbers had been performed. FIG. 5 illustrates a conventional technique 500 for adding two operands and normalizing the result; using the conventional technique, the following three steps must be performed in order to normalize a floating-point addition:

1. The two operands A and B must be added/subtracted using an adder 510.
2. The result must be searched for the leading zero or one, depending on the sign of the result, using a leading zero detector ("LZD") circuit 520.

3. The result of the addition must be shifted by the appropriate amount, and the exponent of the floating point result must be adjusted accordingly, using a shifter 530.

The need to wait, until after the operands A and B have been added, to perform the leading zero detection adds an undesirable delay to obtaining the final result.

Figure 6:
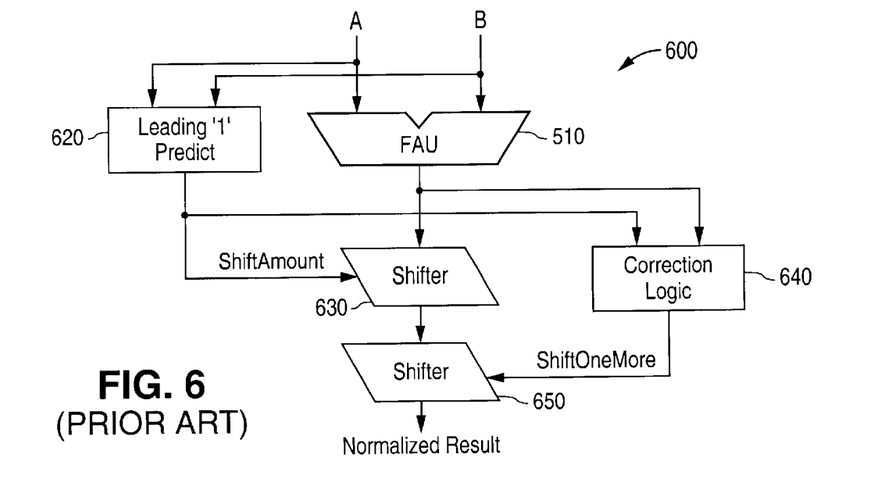
FIG. 6 illustrates a technique for predicting a leading zero (or one) in parallel with the addition of two operands.

Other algorithms have been proposed, however, which can begin a leading zero prediction in parallel with the addition step, thereby eliminating the extra delay. All of the proposed algorithms, however, are only accurate to n−1 counts for the leading zeros, where "n" is the actual number of the leading zero count. FIG. 6 Illustrates a technique 600 for predicting a leading zero (or one) in parallel with the addition of two operands. The operands A and B are received simultaneously by both an adder 510 and a leading one prediction circuit 620. A shifter 630 shifts the output of the adder 510 based on the output of the prediction circuit 620. The outputs of both the adder 510 and the prediction circuit 620 are received by correction logic 640 that determines whether the prediction was correct or off by one; if the prediction was in error, the correction logic 640 causes a shifter 650 to correct the result. Thus, although the prediction algorithm employed in the prediction circuit 620 can sometimes correctly predict the amount of shift required in parallel with the addition step, the need for correction cannot be determined until afterwards, thereby always requiring the subsequent correction step and shifting the result by one more in certain cases.

Figure 7:
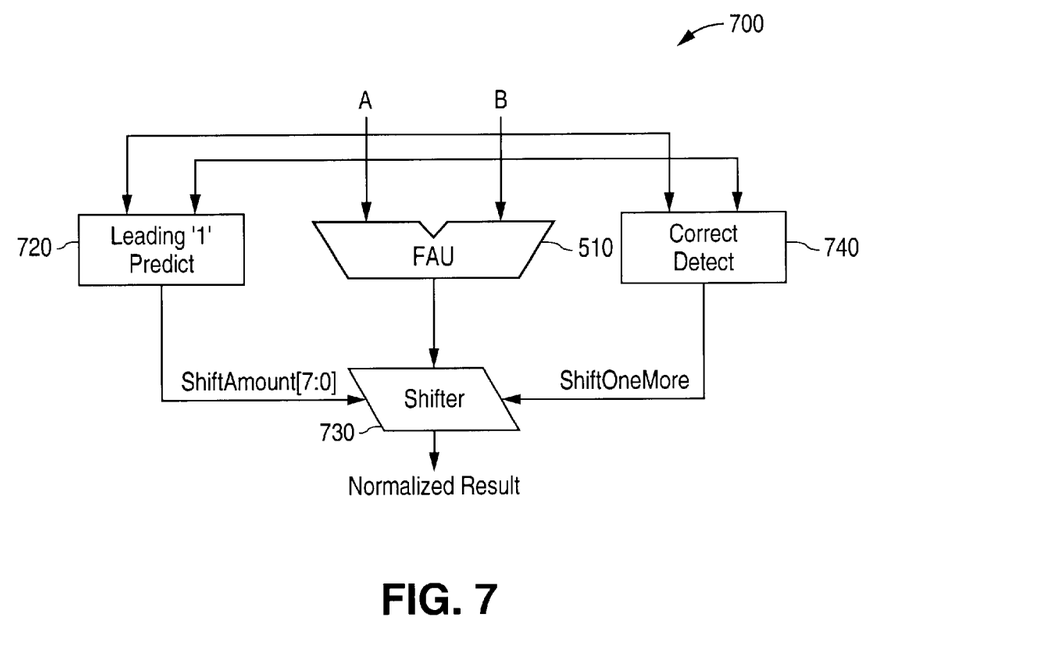
FIG. 7 illustrates the novel technique disclosed by the present invention for adding two operands and normalizing the result.

Turning now to FIG. 7, illustrated is the novel technique 700, in accordance with the principles of the present invention, for adding two operands and normalizing the result; the novel technique 700 performs both a leading bit prediction, using a leading bit predictor 720, and a correction compensation, using predictor corrector logic 740, in parallel with the step of addition, performed using an adder circuit 510. The outputs of the leading one prediction circuit 720 and correction detection circuit 740 control the operation of a shifter 730 to normalize the output of the adder 510. In the embodiment illustrated, the leading bit predictor 720, the adder 510, and the predictor corrector logic 740 receive two floating point operands, or numbers, A and B concurrently.

The leading bit predictor 720 receives the two aligned operands A and B and predicts the amount of shift that will be required by the normalization shifter 730; the prediction occurs at the same time that the adder 510 performs its operation on the two operands to produce a denormal sum or difference thereof. Preferably, the operands are ordered so that A−B is positive. This restriction eliminates negative results from the adder 510 and also simplifies the zero detection algorithm.

Leading zero detection is done in a two step process. The first step is to determine, using the leading bit predictor 720, within +0 and −1 bit where the first one in the result will be and produce a binary encoded result that indicates the bit position. The binary encoded result is then used to shift the mantissa to form a normalized result; the binary encoded result may also be used to adjust the exponent of the floating point number. The second step of the zero detection process, which is performed time-wise in parallel with the first step using the predictor corrector logic 740, is to determine if the binary encoded value is +0 or −1 shifted from the encoded value produced. The signal formed by this step is used to control a final multiplexer (described hereinafter) at the end of a post normalization shifter which will shift the result one more position right if the signal is asserted. This signal may also be used to adjust the exponent of the floating point number.

Figure 8:
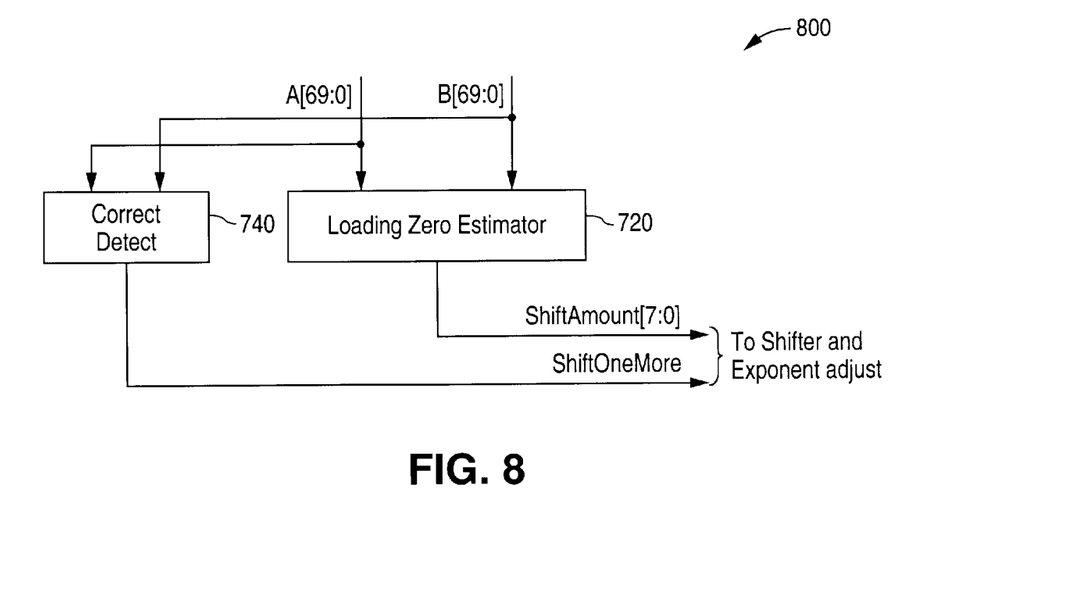
FIG. 8 illustrates a block diagram of the novel leading zero corrector ("LZC") of the present invention.

The present invention thus introduces a leading zero corrector ("LZC") that is operable in parallel with an adder such that the result of the adder can be normalized without post-computational operations. FIG. 8 illustrates a block diagram of the novel LZC 800 of the present invention, which includes both a leading bit predictor (e.g., leading zero estimator) 720 and predictor corrector logic, or "correct detect" 740. The two outputs from the LZC 800 are the estimated shift count and the final correct signal which indicates whether there is a need to shift one more or not.

The algorithm that the leading bit predictor 720 employs is based on a signed digit representation; TABLE 1 shows the digit set and the notation used.

TABLE 1

| A | B | Value | Symbol |
|---|---|-------|--------|
| 0 | 0 | 0 | 0 |
| 0 | 1 | −1 | M |
| 1 | 0 | 1 | P |
| 1 | 1 | 0 | 0 |

The observation that can be made is that the first one in the difference occurs at a position that can be determined by inspecting only two digits. The position is denoted by the first PP, M0, MP, P0 sequence. The reason for these values is that the first digit where there is other than an "0"must have a "P" in it. This is guaranteed by the fact that A>B and the result is positive. If at the first P the next lower significance bit is a P, then, regardless of what the remaining digits are, the first one will be in the position of the first P (since a negative value in lower digits will only cause a borrow-out of the second P and will have no effect on the first P). If the first P is followed by a lower significance M, then the PM digit sets can be effectively thought of as being an 0P digit set (e.g., +2 plus −1). In general, this will continue until there is an 0 or another P. If the case of a string of M's terminating in a P is considered, then the result will be a string of the form PMMM . . . MP, which is the first position where an MP transition is encountered. This string, once simplified, is just a PP as above; thus, regardless of the next digit after the second P, it is known that a P is the first digit.

In the case where a P0 is the first detected digit set, where the first "1" will be cannot be guaranteed; it could be in the position of the P, if the next non-0 digit is positive, or it could be in the position of the 0, if the next non-0 digit is negative. Thus, this is a case where the result from the predictor corrector logic is necessary to make the final determination. The case of a P followed by a string of M's followed by an 0 is equivalent to a P0, since it has the form PMMMM . . . M0, which when simplified is just P0. As was the case with MP above, this is the first condition where the digit set M0 is encountered, so it is easily detectable.

The leading bit predictor looks at two adjacent digits (i.e., 4 bits) and produces a "1" in a given bit position if the inputs encode one of the above digit sets, e.g., PP, M0, MP or P0. Those skilled in the art will recognize that the output of the leading bit predictor is thus a find-first-one function followed by a binary encode; these two functions can be merged into a tree as illustrated in FIG. 9.

Figure 9:
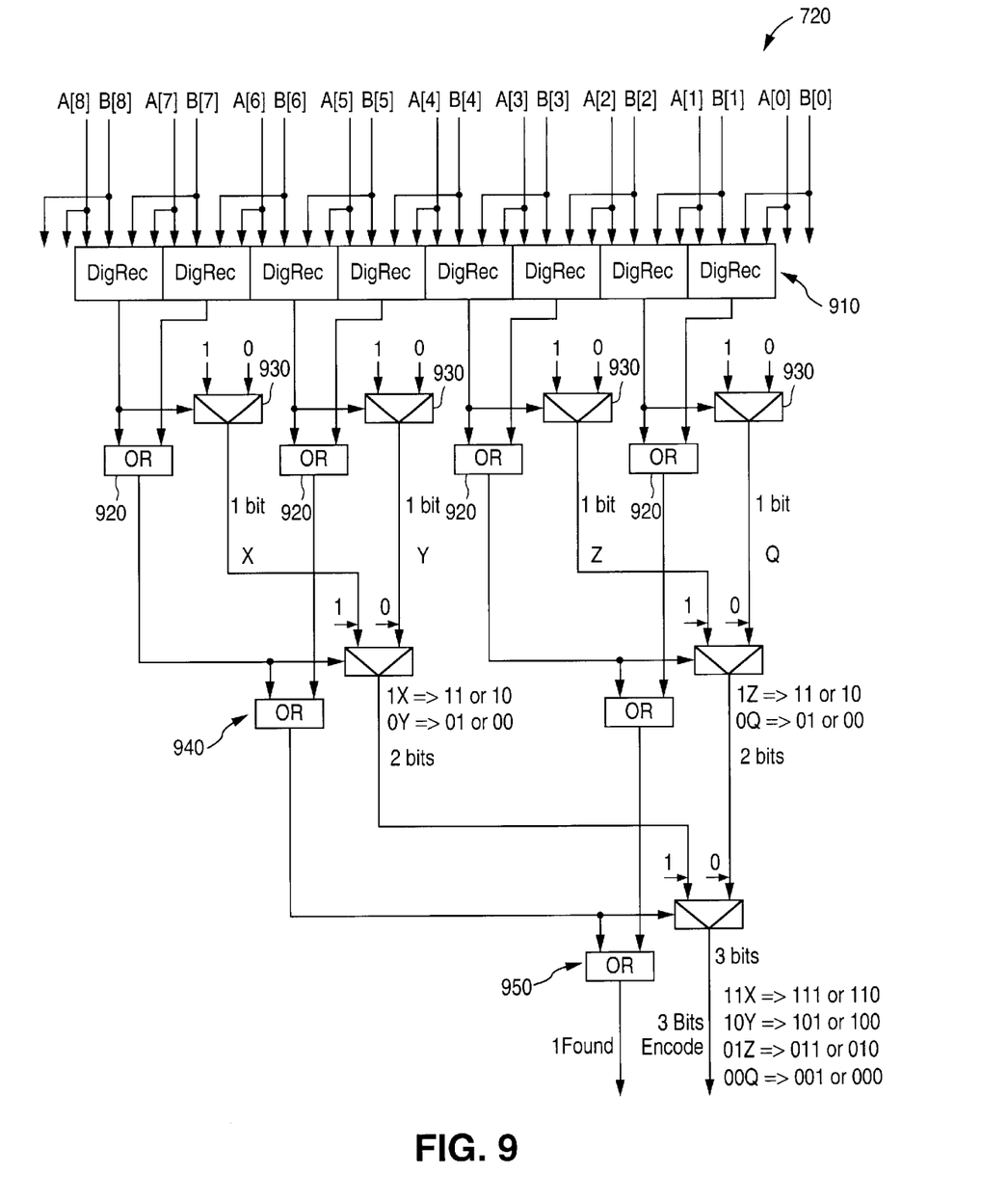
FIG. 9 illustrates an exemplary block schematic of an 8-bit leading bit predictor, according to the principles of the present invention.

FIG. 9 illustrates an exemplary block schematic of an 8-bit leading bit predictor 720, according to the principles of the present invention. The first rank 910 of the function embodied in the leading bit predictor 720 inspects two adjacent input bits; if either of the bits is a "1", the "1" found in one of these two bits is set in the output signal, using an "OR" gate, generally designated 920, and the priority encoded value of the input is selected; those skilled in the art will recognize that multiplexers, generally designated 930, are not necessarily needed but are shown so that the figure illustrates an iterative tree in fewer levels.

In the second rank 940, the two found signals from the prior stage are "OR"ed, which logically results in a 4-input OR built as a tree. If the most significant bit ("MSB") side of the tree had a "1" in it, the bit from the MSB multiplexer concatenated with a "1" is selected; e.g., 1X. If the MSB did not have a "1" in it, e.g., its OR gate has a "0", the result from the LSB multiplexer concatenated with a "0" is selected; e.g. 0Y. Two bits of the encoded value are thus obtained.

In the third rank 950, one more bit is concatenated based on the "OR" of the bits in the prior two stages. Thus, those skilled in the art will recognize the iterative nature of the tree and that the first rank only has an input value of two bits in the encoded form. Assuming a 70-bit input vector, the operation will take $\log_2$ (70), or 7, stages of logic.

Those skilled in the art will recognize that the algorithm will also work with higher radix trees which have a base of $2^n$. Thus, the reduction could be done with a tree of radix 4 quite easily, which would yield 4 levels rather than 7. The decision of which is a better implementation is preferably determined as a function of the interconnect delay; Radix 4 requires fewer levels of more complex logic but fewer interconnects. Thus, if the interconnect delay is a major factor, the tree can be shorted to eliminate some of the long signal paths.

Figure 10:
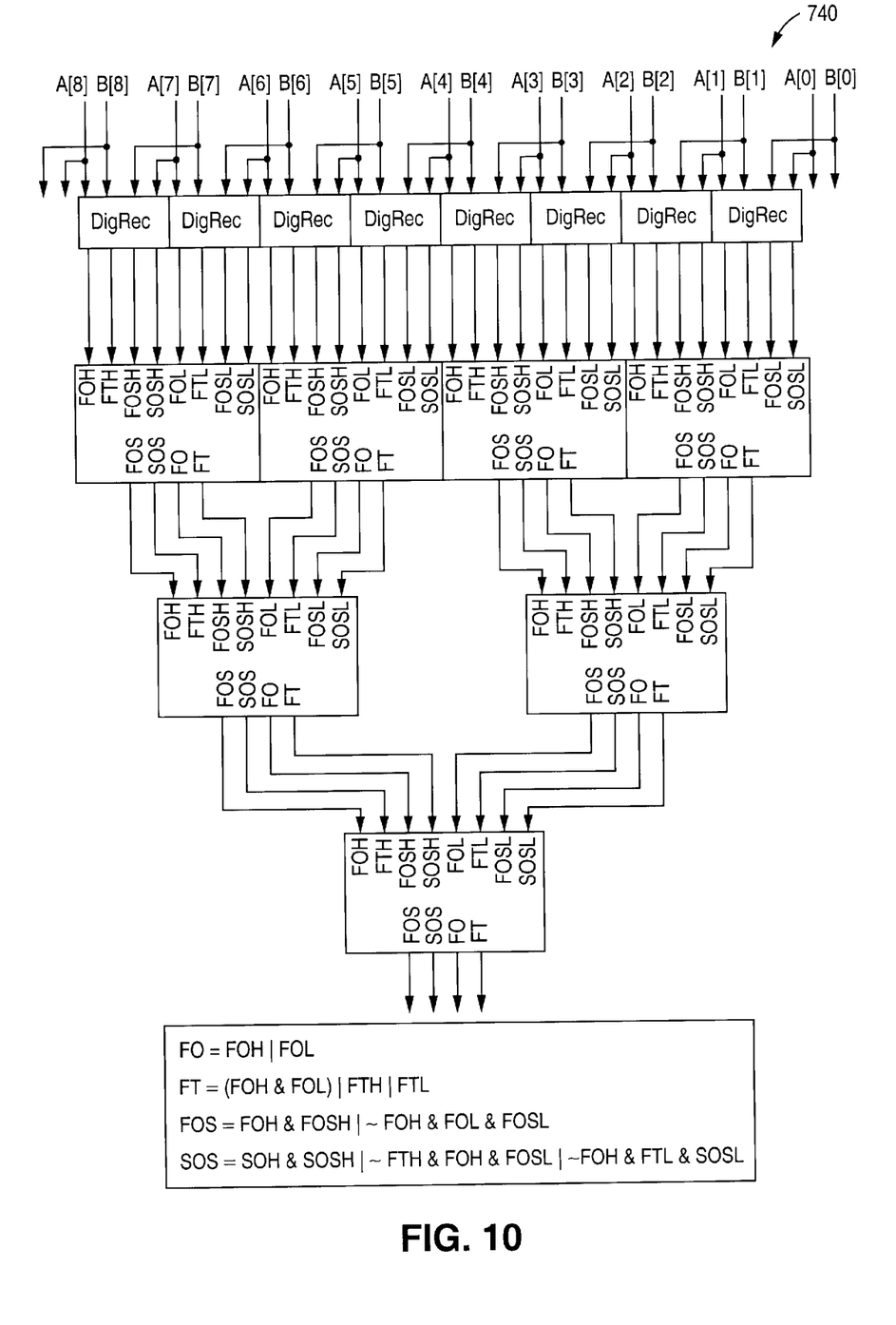
FIG. 10 illustrates an exemplary block schematic of an 8-bit predictor corrector logic, according to the principles of the present invention.

While the leading "1" position is being estimated using the leading bit predictor 720, a parallel circuit, i.e., the predictor corrector logic 740, can compute whether the result is correct or is off by one bit as explained above. The condition where the result must be corrected is when an M0 or a P0 is detected as the first "1" position. In either of these cases, the "1" position can really be one less than the estimated position if the next digit after the string of "0"s is an M. If the next digit after the string of "0"s is a P, then the correct result is guaranteed. The condition can be detected by looking for the second 0P or 0M sequence, assuming that a P0 sequence was found first, since A–B is always positive, and then decrementing the estimated "1" position by one If the second occurrence of 0P or 0M is an 0M. As described above, this can be implemented as a tree as illustrated in FIG. 10. FIG. 10 illustrates an exemplary block schematic of an 8-bit predictor corrector logic 740, according to the principles of the present invention; the logic equations that are performed by each block are shown in the legend of the figure. The signals FO and FT are outputs which indicate that one pattern (FO) or two of the patterns (FT) were identified in the current group. The signals FOS and SOS are the state of the first and second occurrences of the pattern, whether an P or an 0M was found in the first or second group position. The output of the tree only requires two signals, SOS and FT, since it is only necessary to decrement the estimated result if two occurrences of 0P and 0M are found, and then only if the state of the second one is 0M.

From the above, it is apparent that the present invention provides, for use in a processor having a floating point unit (FPU) capable of managing denormalized numbers in floating point notation, logic circuitry for, and a method of adding or subtracting two floating point numbers. In one embodiment, the logic circuitry includes: (1) an adder 510 that receives the two floating point numbers and, based on a received instruction, adds or subtracts the two floating point numbers to yield a denormal sum or difference thereof, (2) a leading bit predictor 720 that receives the two floating point numbers and performs logic operations thereon to yield predictive shift data denoting an extent to which the denormal sum or difference is required to be shifted to normalize the denormal sum or difference, the predictive shift data subject to being erroneous and (3) predictor corrector logic 740 that receives the two floating point numbers and performs logic operations thereon to yield shift compensation data denoting an extent to which the predictive shift is erroneous. The denormal sum or difference, predictive shift data and shift compensation data are providable to a shifter to allow the denormal sum or difference to be normalized.

Although the present invention and its advantages have been described in detail, those skilled in the art should understand that they can make various chances, substitutions and alterations herein without departing from the spirit and scope of the invention in its broadest form.

What is claimed is:

1. For use in a processor having a floating point unit (FPU) capable of managing denormalized numbers in floating point notation, logic circuitry for adding or subtracting two floating point numbers, comprising:

an adder that receives the two floating point numbers and, based on a received instruction, adds or subtracts the two floating point numbers to yield a denormal sum or difference thereof;

a leading bit predictor that receives the two floating point numbers and performs logic operations thereon to yield predictive shift data denoting an extent to which the denormal sum or difference is required to be shifted to normalize the denormal sum or difference, the predictive shift data subject to being erroneous; and predictor corrector logic that receives the two floating point numbers and performs logic operations thereon to yield shift compensation data denoting an extent to which the predictive shift is erroneous, the denormal sum or difference, predictive shift data and shift compensation data providable to a shifter to allow the denormal sum or difference to be normalized.

2. The logic circuitry as recited in claim 1 wherein the adder, the leading bit predictor and the predictor corrector receive the two floating point numbers concurrently.

3. The logic circuitry as recited in claim 1 wherein the predictor corrector detects a second occurrence of an 0P or 0M sequence in a bitwise combination of fraction portions of the two floating point numbers.

4. The logic circuitry as recited in claim 1 wherein the predictor corrector contains plural ranks of pattern analysis logic blocks, each of the pattern analysis logic blocks capable of generating signals indicating a quantity and location of 0P or 0M sequences in a combination of fraction portions of the two floating point numbers.

5. For use in a processor having a floating point unit (FPU) capable of managing denormalized numbers in floating point notation, logic circuitry for adding or subtracting two floating point numbers, comprising:

adder means for adding or subtracting, based on a received instruction, the two floating point numbers to yield a denormal sum or difference thereof;

leading bit predictor means for performing logic operations on the two floating point numbers to yield predictive shift data denoting an extent to which the denormal sum or difference is required to be shifted to normalize the denormal sum or difference, the predictive shift data subject to being erroneous; and predictor corrector means for performing logic operations on the two floating point numbers to yield shift compensation data denoting an extent to which the predictive shift is erroneous, the denormal sum or difference, predictive shift data and shift compensation data providable to a shifter to allow the denormal sum or difference to be normalized.

6. The logic circuitry as recited in claim 5 wherein the adder means, the leading bit predictor means and the predictor corrector means receive the two floating point numbers concurrently.

7. The logic circuitry as recited in claim 5 wherein the predictor corrector detects a second occurrence of an 0P or 0M sequence in a bitwise combination of fraction portions of the two floating point numbers.

8. The logic circuitry as recited in claim 5 wherein the predictor corrector contains plural ranks of pattern analysis logic blocks, each of the pattern analysis logic blocks capable of generating signals indicating a quantity and location of 0P or 0M sequences in a combination of fraction portions of the two floating point numbers.

9. For use in a processor having a floating point unit (FPU) capable of managing denormalized numbers in floating point notation, a method of adding or subtracting two floating point numbers, comprising the steps of:
(a) adding or subtracting, based on a received instruction, the two floating point numbers to yield a denormal sum or difference thereof;
(b) performing logic operations on the two floating point numbers to yield predictive shift data denoting an extent to which the denormal sum or difference is required to be shifted to normalize the denormal sum or difference, the predictive shift data subject to being erroneous; and
(c) performing logic operations on the two floating point numbers to yield shift compensation data denoting an extent to which the predictive shift is erroneous, the denormal sum or difference, predictive shift data and shift compensation data providable to a shifter to allow the denormal sum or difference to be normalized.

10. The method as recited in claim 9 wherein the steps (a), (b) and (c) are initiated concurrently.

11. The method as recited in claim 9 wherein the step (c) comprises the step of detecting a second occurrence of an 0P or 0M sequence in a bitwise combination of fraction portions of the two floating point numbers.

12. The method as recited in claim 9 wherein the step (c) comprises the step of generating signals indicating a quantity and location of 0P or 0M sequences in a combination of fraction portions of the two floating point numbers.

13. A computer system, comprising:
(a) a processor having an integer execution core containing at least one execution pipeline for executing integer instructions and a floating point execution core containing at least one execution pipeline for executing floating point Instructions and capable of managing denormalized numbers in floating point notation, the processor capable of addressing segments of system memory coupled thereto;
(b) system memory for storing integer and floating point instructions including instructions for accessing the system memory;
(c) the processor including instruction fetch logic that fetches integer and floating point instructions from the system memory; and
(d) the processor further including logic circuitry for adding or subtracting two floating point numbers, including:
(i) an adder that receives the two floating point numbers and, based on a received instruction, adds or subtracts the two floating point numbers to yield a denormal sum or difference thereof,
(ii) a leading bit predictor that receives the two floating point numbers and performs logic operations thereon to yield predictive shift data denoting an extent to which the denormal sum or difference is required to be shifted to normalize the denormal sum or difference, the predictive shift data subject to being erroneous, and
(iii) predictor corrector logic that receives the two floating point numbers and performs logic operations thereon to yield shift compensation data denoting an extent to which the predictive shift is erroneous, the denormal sum or difference, predictive shift data and shift compensation data providable to a shifter to allow the denormal sum or difference to be normalized.

14. The computer system as recited in claim 13 wherein the adder, the leading bit predictor and the predictor corrector receive the two floating point numbers concurrently.

15. The computer system as recited in claim 13 wherein the predictor corrector detects a second occurrence of an 0P or 0M sequence in a bitwise combination of fraction portions of the two floating point numbers.

16. The computer system as recited in claim 13 wherein the predictor corrector contains plural ranks of pattern analysis logic blocks, each of the pattern analysis logic blocks capable of generating signals indicating a quantity and location of 0P or 0M sequences in a combination of fraction portions of the two floating point numbers.

17. A method of operating a computer system, comprising the steps of:
(a) applying power to a processor having an integer execution core containing at least one execution pipeline for executing integer instructions and a floating point execution core containing at least one execution pipeline for executing floating point instructions and capable of managing denormalized numbers in floating point notation, the processor capable of addressing segments of system memory coupled thereto;
(b) storing Integer and floating point instructions in a system memory, the instructions including instructions for accessing the system memory;
(c) fetching integer and floating point instructions from the system memory; and
(d) executing instructions in the processor, the processor further including logic circuitry for adding or subtracting two floating point numbers, including:
(i) an adder that receives the two floating point numbers and, based on a received instruction, adds or subtracts the two floating point numbers to yield a denormal sum or difference thereof,
(ii) a leading bit predictor that receives the two floating point numbers and performs logic operations thereon to yield predictive shift data denoting an extent to which the denormal sum or difference is required to be shifted to normalize the denormal sum or difference, the predictive shift data subject to being erroneous, and
(iii) predictor corrector logic that receives the two floating point numbers and performs logic operations thereon to yield shift compensation data denoting an extent to which the predictive shift is erroneous, the denormal sum or difference, predictive shift data and shift compensation data providable to a shifter to allow the denormal sum or difference to be normalized.

18. The method as recited in claim 17 wherein the adder, the leading bit predictor and the predictor corrector receive the two floating point numbers concurrently.

19. The method as recited in claim 17 wherein the predictor corrector detects a second occurrence of an 0P or 0M sequence in a bitwise combination of fraction portions of the two floating point numbers.

20. The method as recited in claim 17 wherein the predictor corrector contains plural ranks of pattern analysis logic blocks, each of the pattern analysis logic blocks capable of generating signals indicating a quantity and location of 0P or 0M sequences in a combination of fraction portions of the two floating point numbers.

* * * * *

UNITED STATES PATENT AND TRADEMARK OFFICE
CERTIFICATE OF CORRECTION

PATENT NO. : 6,405,232 B1
DATED : June 11, 2002
INVENTOR(S) : Daniel W. Green et al.

It is certified that error appears in the above-identified patent and that said Letters Patent is hereby corrected as shown below:

Column 1,
Line 40, delete "T/O" and insert -- I/O --;

Column 6,
Line 67, delete "Instructions" and insert -- instructions --;

Column 7,
Line 25, delete "7D" and insert -- 75 --;

Column 8,
Line 10, delete "spec-al" and insert -- special --;
Line 59, after "given" delete "Instruction" and insert -- instruction --;

Column 9,
Line 41, delete "Interface" and insert -- interface --;

Column 13,
Line 43, delete "If" and insert -- if --;
Line 54, delete "P" and insert -- 0P --.

Signed and Sealed this

Tenth Day of May, 2005

JON W. DUDAS
*Director of the United States Patent and Trademark Office*